W. S. ELLIOTT.
TRAP.
APPLICATION FILED OCT. 20, 1908.
977,943.
Patented Dec. 6, 1910.
2 SHEETS—SHEET 2.
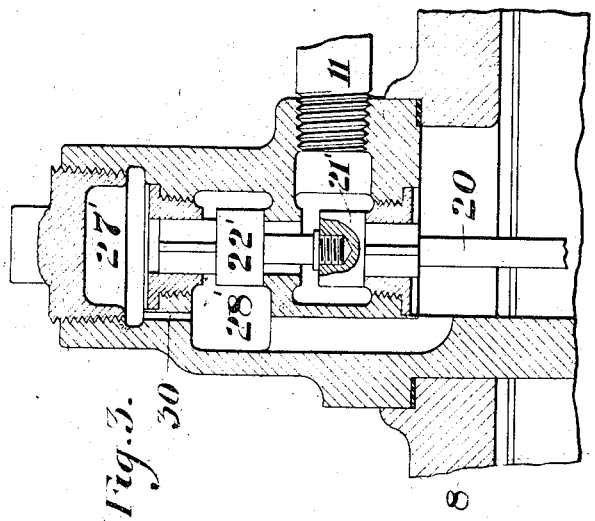
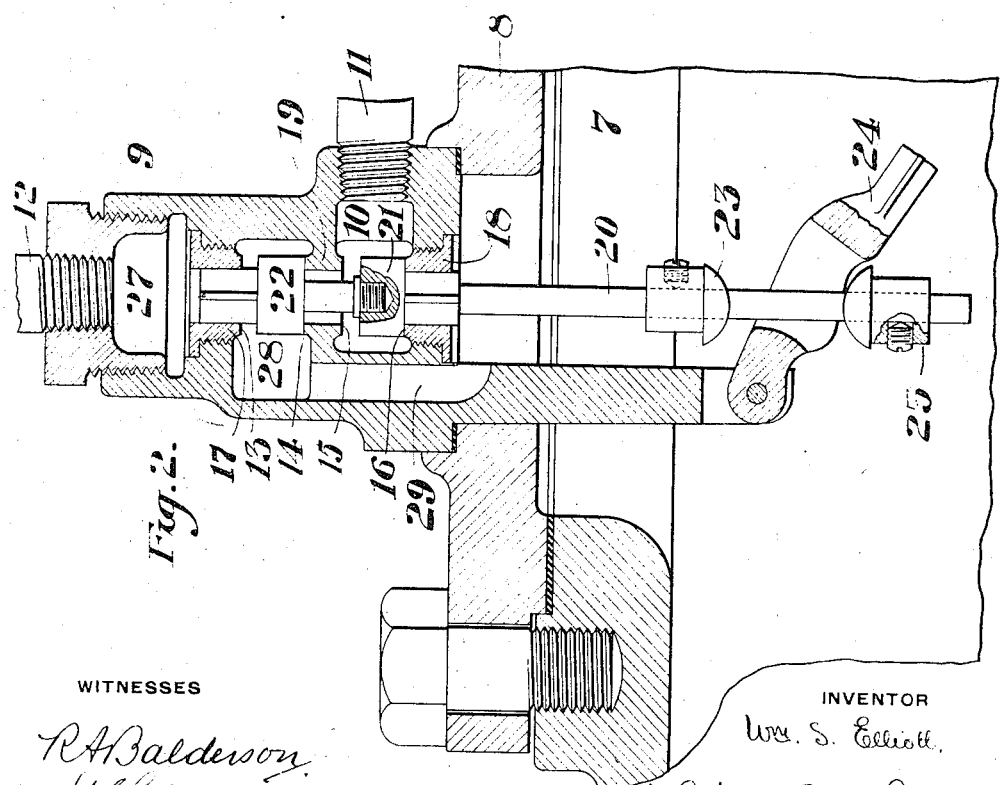
WITNESSES
R. A. Balderson
INVENTOR
Wm. S. Elliott
by Bakewell, Byrnes Parmelee,
his attys

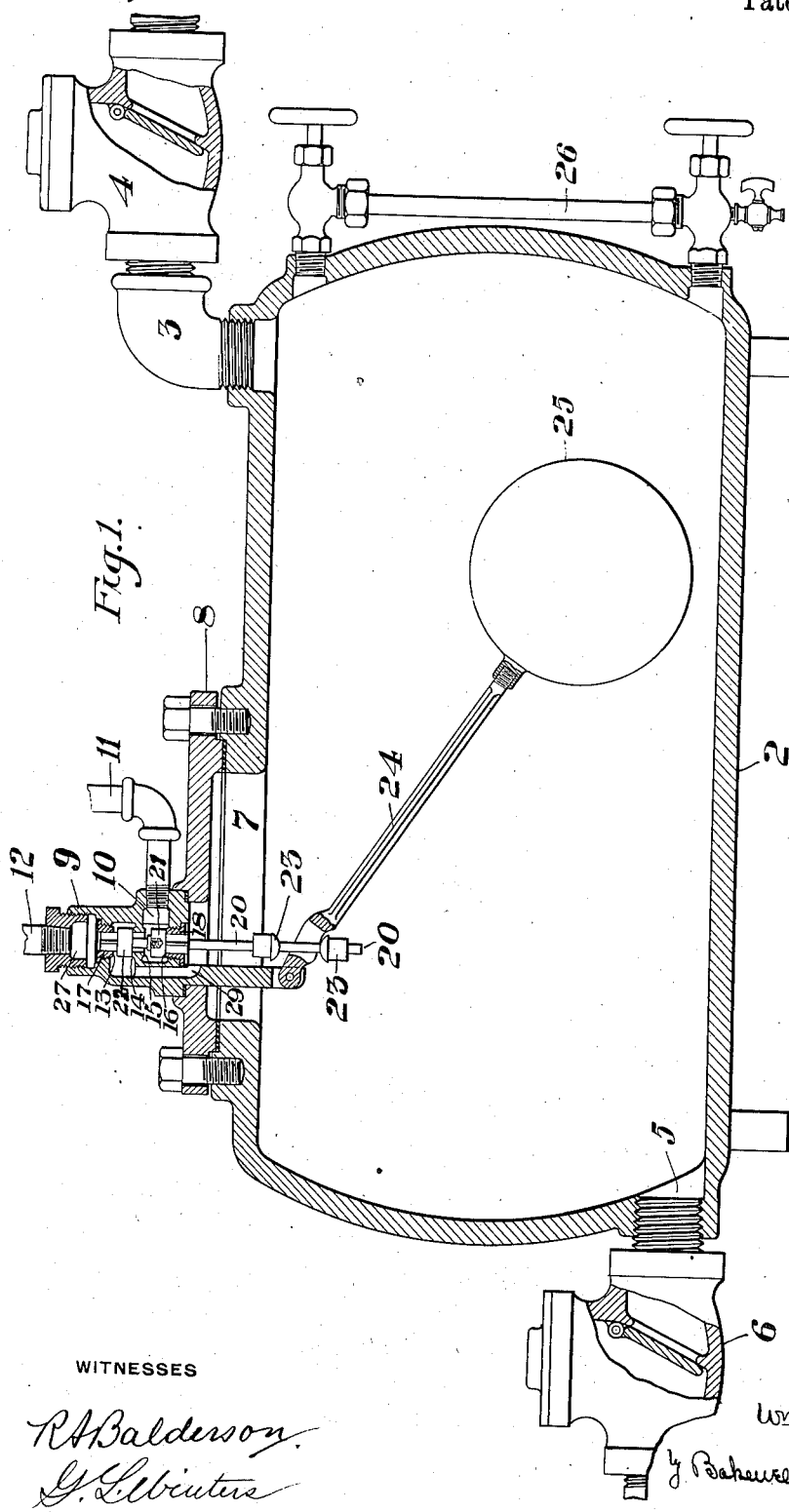

UNITED STATES PATENT OFFICE.

WILLIAM S. ELLIOTT, OF PITTSBURG, PENNSYLVANIA.

TRAP.

977,943.

Specification of Letters Patent.

Patented Dec. 6, 1910.

Application filed October 20, 1908. Serial No. 458,589.

*To all whom it may concern:*

Be it known that I, WILLIAM S. ELLIOTT, of Pittsburg, Allegheny county, Pennsylvania, have invented a new and useful Improvement in Traps, of which the following is a full, clear, and exact description, reference being had to the accompanying drawings, forming part of this specification, in which—

Figure 1 is a sectional elevation of one form of trap embodying my invention; Fig. 2 a sectional detail view of the valve shown in Fig. 1; and Fig. 3 is a detail sectional view illustrating a modification of the valve.

My invention has relation to traps, and more particularly to traps in which the pressure is at times less than the initial working pressure in the system to which the trap is connected.

The invention may, for instance, be employed for trapping and returning condensed water to boilers, or for trapping the condensed water from condensers, and for other similar purposes.

The object of the invention is to provide a positive and simple means for handling condensed fluids and also to provide improved valve mechanism for operating such devices and other similar devices.

The nature of my invention will be best understood by reference to the accompanying drawings, in which I have shown two different embodiments thereof which will now be described, it being premised, however, that the invention is adaptable to other purposes and that various changes may be made in the details of construction and arrangement of the parts by those skilled in the art without departing from the spirit and scope of my invention as defined in the appended claims.

Referring first to the construction shown in Fig. 1, the numeral 2 designates a trap vessel or chamber having a connection at 3 with the pipe which is connected with the chamber or vessel containing the condensed water which it is desired the trap shall handle, this connection 3 being provided with a check valve 4 opening in the direction of the trap chamber. At the opposite end of the chamber, preferably at or near the lowest point of the chamber, is an outlet connection 5 provided with a check valve 6 opening in the same direction as the valve 4 but away from the trap chamber. The vessel 2 is provided with a suitable flanged opening 7 to permit access thereto, which is closed by a cover-plate 8. Secured to this cover-plate, is a valve casing 9 having an inlet port 10 which is connected, as by pipe 11, either with the atmosphere or with some source of pressure which is equal to or higher than the pressure of the atmosphere. When the trap is used as a return trap, this connection is usually made to the vessel into which the water is to be returned; but when the trap is used as a vacuum trap, this connection may open to the atmosphere or to a pressure higher than the atmosphere, or to any steam line carrying a pressure higher than the atmosphere. This casing is also provided with an inlet pipe connection 12 leading from a vacuum chamber to the condenser. The casing 9 is also provided with the internal valve seats 13, 14, 15 and 16. The seat 13 in the construction shown, is formed by a screw plug 17, and the seat 16 is formed by a similar plug 18, but these seats may be formed in any other suitable manner. The seats 14 and 15 are shown as formed at the opposite sides of a central wall or bridge 19. 20 designates a valve stem which extends within the casing 9 and which is provided with the two valve members 21 and 22, the valve 22 being arranged to seat alternately against the seats 13 and 14 and the valve 21 alternately against the seats 15 and 16 in the manner hereinafter more fully described. The rod is provided at its lower portion, which depends within the trap vessel or chamber, with the stop collars 23, which are engaged by a float lever 24 carrying the float 25. 26 designates a gage attached to the vessel 2 for the purpose of indicating the water level therein.

The operation of this form of the invention is as follows: When the parts are in the positions shown in the drawings, the vessel or chamber 2 has just discharged, and the falling of the float 25 has actuated the rod 20 to close the valve members 21 and 22, upon their respective seats 16 and 14. This cuts off communication between the inlet pipe 11 and the chamber 2. The chamber 27 is now connected with the valve chamber 28, and by means of a port 29, the chamber 28 is connected with the chamber 2. The vacuum action of the pipe 12 now acts to exhaust the chamber 2, until the pressure therein falls to such a point that the water overcomes the weight of the check valve 4, and flows into said chamber 2. By this time, the pressure in the chamber 2 is below that of the atmosphere and the atmosphere holds the check valve 6 closed. The water then continues to flow into the chamber 2 and as the lever rises it carries the float up to such a point that the float-lever engages the stop collar 23 and thereby shifts the valve members 21 and 22 so that the valve member 22 closes against the seat 13. This closes the connection between the condenser pipe and the chamber 28 and opens communication with the pipe 11. Pressure now enters the chamber through the pipe 11, thereby increasing the pressure in such chamber to a sufficient extent to close the check valve 4. The pressure continues to rise until the pressure in the chamber is equal or greater than the atmospheric pressure, holding the check valve 6 closed. The valve 6 will then open and discharge the contents of the trap; and as the trap empties, the float-lever engages the stop collar 23 and shifts the valve members to their positions shown in the drawings. When the valve members 21 and 22 are thus shifted, the valve member 21 closes against the seat 15, and the valve member 22 closes against the seat 13. The under side of the valve member 22 and the upper side of the valve member 21 are now both exposed to the pressure in the chamber 22. Since the check valve 6 opens to the atmosphere, and will open when the pressure in chamber 2 slightly exceeds atmospheric pressure, the pressure on the under side of valve member 21 can not greatly exceed atmospheric pressure. This pressure, together with the vacuum action upon the upper side of the valve member 22 is just about sufficient to hold the valve in this position against its gravity.

To adapt the device for use as a return trap, all that is required is, as shown in Fig. 3, to plug up the connection with the pipe 12 and to provide a port 30 connecting the chamber 28' with the chamber 27' for the purpose of equalizing the pressure on the upper side of the valve member 22' and the lower side of the valve member 21', these valves corresponding to and being arranged in the same manner as the valve members 21 and 22 of the form first described. Instead of plugging up the connection of pipe 12, connection may be made through this pipe with a convenient source of pressure lower than the pressure in the system in which the trap is connected. When so used, the connection 3 leads to the point where the condensed steam collects, usually to the receiver, and the connection at 5 forms the return connection to the boiler or other vessel to which the water is to be returned. The pipe 11 is connected to the boiler, or it may be connected to the steam space of the vessel to which the condensed water is to be returned.

The advantages of my invention result from the ease with which the trap may be adapted to various uses, and to the simplicity of the controlling valves. Owing to the practically perfect balancing of the valves in all positions thereof, I am enabled to use comparatively large valves and thereby provide correspondingly large ports so that the operations controlled by the valves may be more quickly effected. A further advantage, resulting from the use of these large valves, is that they are more readily manufactured and are less apt to get out of order, being stronger and less liable to breakage. It will be understood, however, that I do not limit myself to the exact form of valve mechanism which I have herein shown and described, it being obvious that the form of the valves and the arrangement of their seats, together with the construction and attachment of the valve casing and of other details of the device may be largely departed from without departing from my invention.

What I claim is—

1. In trap mechanism of the character described, a chamber or vessel a valve casing connected to the chamber or vessel and having four valve-seating portions arranged in line, and a valve stem having two separated valve members, each of which has a valve face at each end, said faces being adapted to the seating portions, a port arranged to be alternately opened and closed by one of the valve members, a passage leading from the inner side of said valve member to the chamber in which the second valve member is seated, and a port connecting the two valve chambers and arranged to be opened and closed by the second valve chamber simultaneously with the opening and closing of the first named port together with a float connected to the valve stem, substantially as described.

2. In a trap, a trap chamber or vessel, a valve casing secured thereto and having an inlet port, a float-operated valve stem extending into said casing, a valve member on said stem controlling said port, a second valve member also carried by said stem, seats for said valve members in both the open and closed positions of the valve, and means for equalizing the pressure on opposite sides of said members in the open and closed position of the valve; substantially as described.

3. In a trap, a trap vessel or chamber, a valve casing connected thereto and communicating with the chamber or vessel, said casing having an inlet port, a valve stem extending within the casing, a float lever engaging the valve stem, a valve on said stem controlling said port, and a second valve member also carried by said stem, the valve casing having a port connecting the trap chamber with the chamber in which the second valve member operates to thereby equalize the pressure on opposite sides of the valve members in both positions of the valve; substantially as described.

4. In a trap of the character described, a chamber or vessel having valved inlet and outlet connections, a valve casing secured to said chamber and having four seating portions arranged in line, and a valve stem having two separated valve members each of which has a valve face at each end, each of said faces being adapted to one of said seating portions, the casing also having two ports which are alternately opened and closed by the seating and unseating of the valve faces, means for substantially equalizing the pressure on said valve faces, and float means for actuating the valve, substantially as described.

In testimony whereof, I have hereunto set my hand.

WILLIAM S. ELLIOTT.

Witnesses:
GEO. B. BLEMING,
H. M. CORWIN.